United States Patent [19]

Wolff

[11] 3,924,193

[45] Dec. 2, 1975

[54] LOGIC CIRCUIT INCLUDING J-K FLIP FLOP PROVIDING OUTPUT PULSE IN RESPOSE TO LONGER DURATION INPUT PULSE

[75] Inventor: Sverre Wolff, Sunnyvale, Calif.

[73] Assignee: Hycel, Inc., Houston, Tex.

[22] Filed: Oct. 29, 1974

[21] Appl. No.: 518,372

[52] U.S. Cl. ................ 328/109; 307/215; 307/217; 307/232; 307/247 R; 328/92

[51] Int. Cl.[2] ..................... H03K 5/20; H03K 19/12

[58] Field of Search........ 307/217, 215, 232, 247 R, 307/289, 291; 328/109, 110, 206, 92, 93

[56] References Cited

UNITED STATES PATENTS

| | | | |
|---|---|---|---|
| 3,487,317 | 12/1969 | Gowan | 307/247 R |
| 3,694,667 | 9/1972 | Staker, Jr. | 307/232 |

*Primary Examiner*—Stanley D. Miller, Jr.
*Attorney, Agent, or Firm*—Timothy L. Burgess; Harry W. Barron

[57] ABSTRACT

There is disclosed a logic circuit utilizing a bistable multivibrator and NOR gate digital components to provide an interrupt request signal to a utilization device in response to the leading edge of a longer duration switching signal. The switching signal is applied to the set input of the bistable multivibrator and further to a gate enabled by the set output of the bistable multivibrator being reset. The bistable multivibrator is then set upon command of the utilization device, causing the gate to become disabled. The trailing edge of the switching signal causes the bistable multivibrator to become reset, thereby re-establishing the initial conditions.

8 Claims, 2 Drawing Figures

Figure 1:
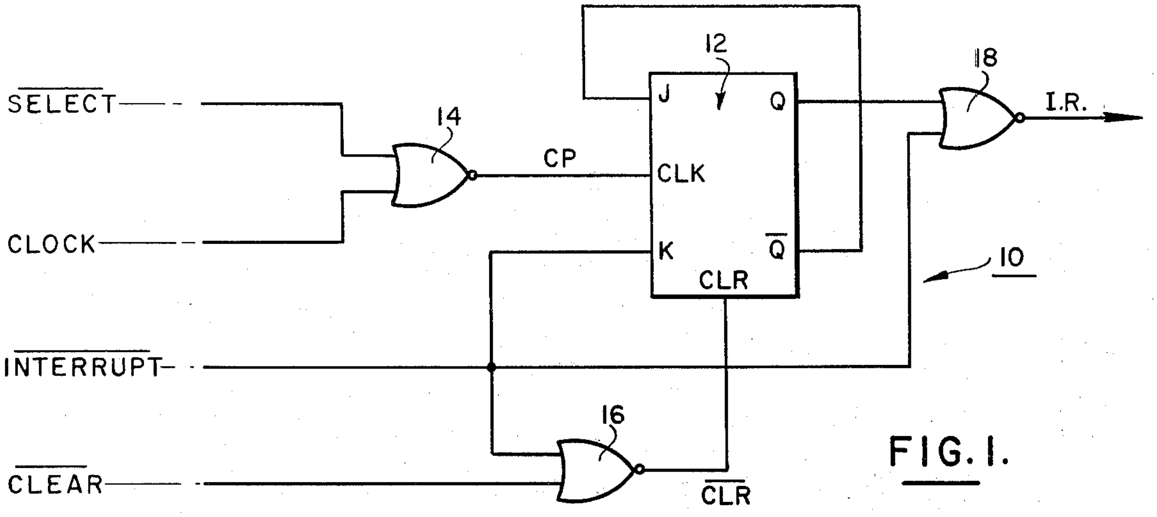

LOGIC CIRCUIT INCLUDING J-K FLIP FLOP PROVIDING OUTPUT PULSE IN RESPOSE TO LONGER DURATION INPUT PULSE

This invention relates to a logic circuit and more particularly to a logic circuit utilizing standard digital gates and a bistable multivibrator which operates to provide an interrupt request pulse in response to the leading edge of a longer duration pulse, and which is reset in response to the trailing edge of the longer duration pulse.

When a single central processing unit is used to provide timing and control functions for a multi-channel system, provisions must be made to insure that the processor is capable of servicing all channels on a time-sharing basis. For this purpose, the system must contain electronic circuits which, when certain prescribed events occur, generate requests for service for each channel separately. Such circuits must meet the following requirements: (1) upon the occurrence of the event, a request for service must be generated; (2) which request must remain present until honored by the processor; (3) which request must be terminated immediately after having been honored so as not to again be honored; and (4) upon the removal of the event, the circuit must be again initialized to be ready for the occurrence of another event.

A monostable multivibrator is not suitable for the purposes above defined in a multi-channel system because the pulse provided thereby is not controllable in duration, except by initial circuit design and the fixed duration pulse of a monostable multivibrator may be of either a longer or shorter duration than the time between the occurrence of the event and the honoring of the request for service.

In accordance with one preferred embodiment of this invention there is provided a logic circuit for providing a request for service signal to servicing means in response to the occurrence of an event manifested by an event signal. The request signal is provided from the time the event occurs until the time the servicing means provides a signal indicating service is to occur. The circuit comprising bistable means having a true data input, a false data input, a clock input, a clear input, a true output and a false output. The signals provided by the true output and the false output are opposite in state. The false output is coupled to the true input, and the signal provided by the true output becomes a true state whenever a switching signal is applied to the clock output at the time a signal having a true state is applied to the true data input and a signal having a false state is applied to the false data input. The circuit also includes first means for applying the event signal as a false state signal to the false data input and second means for applying said event signal to said clear input so that the trailing edge of the event signal causes the true output to provide a false state signal. Further, there is provided third means for providing the switching signal to the clock input in response to the servicing means providing the signal indicating service. Finally, gating means are included to provide the request signal whenever the event signal is provided and the true output provides a true state signal.

Figure 2:
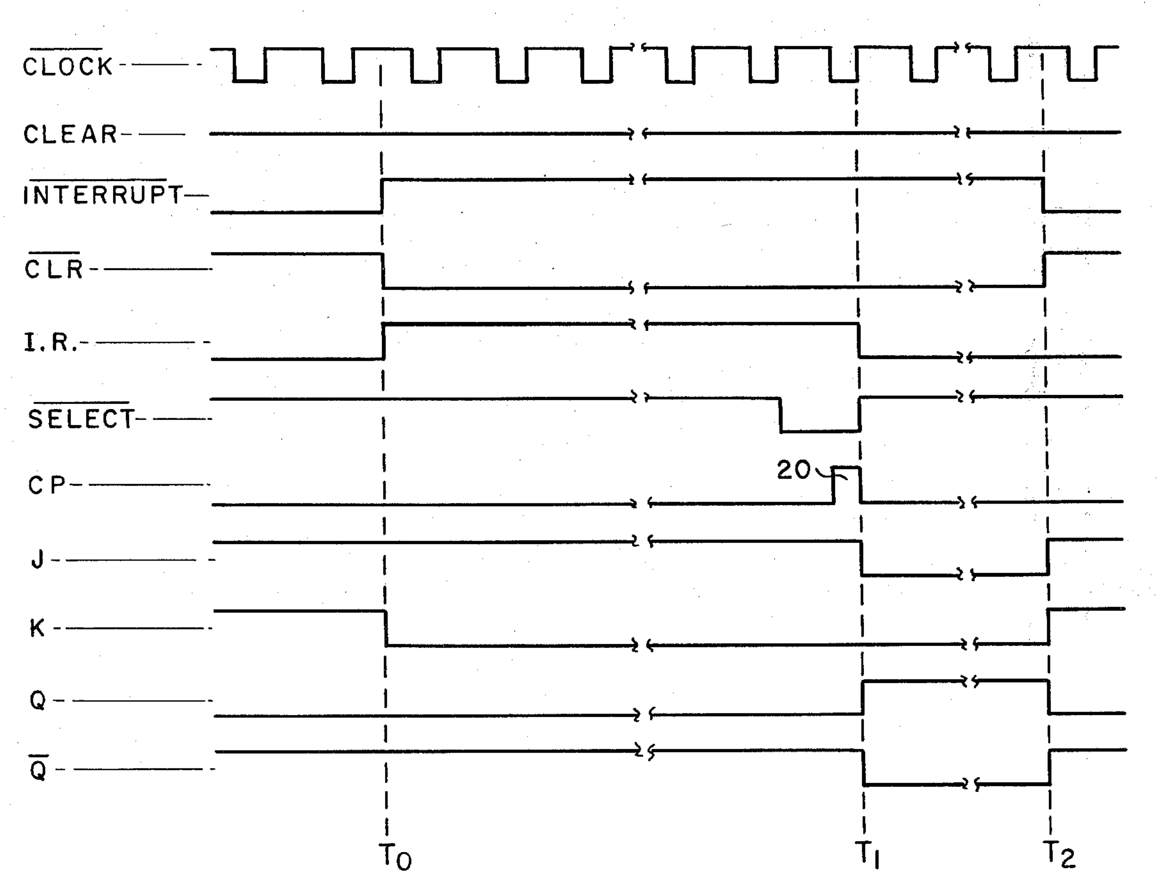

A detailed description of one preferred embodiment of the logic circuit of this invention is hereinafter given, with specific reference being made to the following FIGURES, in which FIG. 1 shows the basic logic circuit; and FIG. 2 shows a series of timing diagrams useful in understanding the operation of the logic circuit shown in FIG. 1.

Referring now to FIG. 1, logic circuit 10 includes flip-flop 12 and three NOR gates 14, 16 and 18, all of which are standard transistor-transistor logic integrated circuits. Flip-flop 12 includes four inputs respectively labeled J, CLK, K and CLR, and two outputs q and $\overline{Q}$. Flip-flop 12 is a standard digital bistable multivibrator circuit which may be purchased from a number of suppliers. For instance, flip-flop 12 may be a Number SN74107 integrated circuit manufactured by Texas Instruments, Inc. Circuit 12 operates such that whenever a pulse is applied to the CLK input at the time the signal applied to the J input is a logic 1 and the signal applied to the K input is a logic 0, the signal at the Q output becomes a logic 1 and the signal at the $\overline{Q}$ output becomes a logic 0. Further, whenever a negative going signal, that is the trailing edge of a logic 1 pulse, is applied, to the CLR input, the Q output becomes logic 0 and the $\overline{Q}$ output becomes logic 1. As used herein, the term "logic 0 signal" means a signal having a voltage of approximately zero volts and the term "logic 1 signal" means a signal having a voltage of approximately five volts. However, it should be noted that for other type logic circuits different value or opposite polarity voltage may be used. Also, other terminology such as true state and false state can be used.

NOR gate 14 is responsive to a $\overline{\text{SELECT}}$ signal and to a $\overline{\text{CLOCK}}$ signal and provides an output signal CP to the CLK input of flip-flop 12. NOR gate 16 is responsive to an $\overline{\text{INTERRUPT}}$ signal and a CLEAR signal and provides an output signal $\overline{\text{CLR}}$ to the CLR input of flip-flop 12. NOR gate 18 is responsive to the signal from the Q output of flip-flop 12 and to the $\overline{\text{INTERRUPT}}$ signal, and provides an output signal which is the INTERRUPT REQUEST (IR) signal as the output of logic circuit 10. As is well known, a NOR gate, such as NOR gates 14, 16 and 18, provides a logic 1 signal at its output when all of the input signals to which it responds are logic 0. If any or all of the input signals are logic 1, then the output signal will be logic 0.

The $\overline{\text{INTERRUPT}}$ signal which is applied to NOR gates 16 and 18 is also applied to the K input of flip-flop 12. The $\overline{Q}$ output signal from flip-flop 12 is applied to the J input of flip-flop 12. The $\overline{\text{CLOCK}}$ signal applied to NOR gate 14 is the system clock signal and has a logic 0 pulse at a periodic rate. The CLEAR signal applied to NOR gate 16 is a logic 1 pulse signal which is applied each time power is applied to the system in which logic circuit 10 is included and is logic 0 other times. It will be assumed hereinafter that the CLEAR signal is logic 0 at all times.

The $\overline{\text{INTERRUPT}}$ signal, applied to NOR gates 16 and 18 and to the K input of flip-flop 12, is a long duration logic 0 pulse which is provided from means (not shown) external to logic circuit 10, such as a switch which is closed and may be logic 0 for several seconds or minutes. When the $\overline{\text{INTERRUPT}}$ signal first becomes logic 0 it is desired to provide a logic 1 pulse signal from NOR gate 18 until such time as the $\overline{\text{SELECT}}$ signal becomes logic 0 and thereafter returns to logic 1. The SELECT signal applied to NOR gate 14 becomes logic 0 after the time the IR signal provided from NOR gate 18 becomes logic 1 and returns to logic 1 one clock pulse time later. In actual practice, the IR signal is a request to a central processor (not shown) for service and the $\overline{\text{SELECT}}$ signal is the response from the processor indicating service to means (not shown) associated with logic circuit 10 is to be given.

The operation of logic circuit 10 will not be described, with reference being made to the waveforms shown in FIG. 2. In FIG. 2 the $\overline{\text{SELECT}}$, $\overline{\text{CLOCK}}$, $\overline{\text{INTERRRUPT}}$ and CLEAR signals are shown, as are the signals applied to the J, K and CLR inputs and provided from the Q and $\overline{Q}$ outputs of flip-flop 12; in addition the IR signal provided from NOR gate 18 is shown. The initial conditions of logic circuit 10 are shown at the left of time TO in FIG. 2 and these are that the $\overline{\text{SELECT}}$, $\overline{\text{INTERRUPT}}$, J, K and $\overline{Q}$ signals are all logic 1, and the CLEAR, CLR, Q and IR signals are all logic 0. At time TO, the $\overline{\text{INTERRUPT}}$ signal becomes logic 0, thereby signalling that an INTERRUPT condition is occurring, that is, for instance, a switch has been opened. Because the Q signal is logic 0 at this time, the logic 0 $\overline{\text{INTERRUPT}}$ signal causes the IR signal from the output of NOR gate 18 to become logic 1. At some undetermined time after the IR signal becomes logic 1, the $\overline{\text{SELECT}}$ signal becomes logic 0 for one clock time. This enables one $\overline{\text{CLOCK}}$ signal pulse 20 to be applied through NOR gate 14 to the CLK input of flip-flop 12. At time T1, when the trailing edge of $\overline{\text{CLOCK}}$ pulse 20 is applied to flipflop 12, the J input of flip-flop 12 is logic 1 and the K input of the flip-flop 12, which is the $\overline{\text{INTERRUPT}}$ signal, is logic 0. This causes flip-flop 12 to change states so that the Q output becomes logic 1 and the $\overline{Q}$ output becomes logic 0. With the $\overline{Q}$ output at logic 0, the J input becomes logic 0. When flip-flop 12 changes states at time T1, the IR signal at the output of NOR gate 18 becomes logic 0 because of the Q output signal becoming logic 1.

After time T1, the conditions just explained remain until time T2, when the $\overline{\text{INTERRUPT}}$ signal returns to the logic 1 state. This causes the signal applied from the output of NOR gate 16 to the CLR input of flip-flop 12 to go from logic 1 to the logic 0 state. Upon the falling edge of a signal applied to the CLR input of flip-flop 12, flip-flop 12 is reset so that the signal at the Q output thereof becomes logic 0 and the signal at the $\overline{Q}$ output thereof becomes 1. The $\overline{Q}$ signal becoming logic 1 causes the signal applied to the J input to become logic 1 and flip-flop 12 is now reset to the initial condition which existed prior to time T0. Thus, the next time the $\overline{\text{INTERRUPT}}$ signal becomes logic 0, a logic 1 IR signal will be provided in the manner explained above.

What is claimed is:

1. A logic circuit for providing a request for service signal to servicing means in response to the occurrence of an event manifested by the occurrence of an event signal, said request signal being provided from the time said event occurs until the time said servicing means provides a signal indicating service is to occur, said circuit comprising:

bistable means having a true data input, a false data input, a clock input, a clear input, a true output and a false output, the signals provided by said true output and said false output being opposite in state, said false output being coupled to said true data input, the signal provided by said true output becoming a true state whenever a switching signal is applied to said clock input at the time a signal having a true state is applied to said true data input and a signal having a false state is applied to said false data input;

first means for applying said event signal as a false state signal to said false data input;

second means for applying said event signal to said clear input so that the trailing edge of said event signal causes said true output to provide a signal having a false state;

third means for providing said switching signal to said clock input in response to said servicing means providing said signal indicating service; and gating means for providing said request signal whenever said event signal is provided and said true output provides a true state signal.

2. The invention according to claim 1 wherein said bistable means is a bistable multivibrator, said true and false data inputs being J and K inputs respectively, and said true and false outputs being Q and $\overline{Q}$ outputs respectively.

3. The invention according to claim 1 wherein said event signal has a leading edge changing from a true state to a false state and a trailing edge changing from a false state to a true state.

4. The invention according to claim 1 wherein said gating means is a NOR gate responsive to said event signal and the signal provided by said true output.

5. The invention according to claim 1 wherein said second means includes means for inverting said event signal.

6. A logic circuit comprising:

J-K flip-flop circuit means having J, K, CLOCK and CLEAR inputs and Q and $\overline{Q}$ outputs;

means for providing a long duration logic 0 pulse signal to said K input;

inverting means for inverting said long duration logic 0 pulse signal and for providing said inverted signal to said clear input to cause said Q output to provide a logic 0 signal and said $\overline{Q}$ output to provide a logic 1 signal after the trailing edge of the pulse of said inverted signal;

means for electrically coupling said $\overline{Q}$ output to said J input;

means for providing a signal to said clock input to cause said Q output to provide a logic 1 signal and said $\overline{Q}$ output to provide a logic 0 signal after a clock pulse is applied at a time when the J input has a logic 1 signal applied thereto and the K input has a logic 0 signal applied thereto; and gating means for providing output pulse whenever said Q output provides a logic 0 signal and said long duration pulse signal is logic 0.

7. The invention according to claim 6 wherein said means for providing a clock pulse includes a means for inhibiting the provision of said clock pulses until a response occurs to said long duration pulse signal becoming a logic 0 value.

8. The invention according to claim 7 wherein said gating means is a NOR gate which provides said output pulse as a logic 1 pulse signal.

* * * * *